United States Patent [19]
Bauer

[11] Patent Number: 5,680,846
[45] Date of Patent: Oct. 28, 1997

[54] FUEL INJECTION METHOD FOR MULTICYLINDER INTERNAL COMBUSTION ENGINES

[75] Inventor: Bernhard Bauer, Regensburg, Germany

[73] Assignee: Siemens Aktiengesellschaft, Munich, Germany

[21] Appl. No.: 647,840

[22] Filed: May 15, 1996

[30] Foreign Application Priority Data

May 15, 1995 [DE] Germany ............... 195 17 749.5

[51] Int. Cl.⁶ ............... F02D 41/06; F02D 41/36
[52] U.S. Cl. ............... 123/490; 123/491
[58] Field of Search ............... 123/490, 491

[56] References Cited

U.S. PATENT DOCUMENTS

| | | | |
|---|---|---|---|
| 3,923,031 | 12/1975 | Keranen | 123/491 |
| 4,941,449 | 7/1990 | Höptner et al. | 123/491 |
| 4,998,522 | 3/1991 | Achleitner | 123/491 |

FOREIGN PATENT DOCUMENTS

| | | |
|---|---|---|
| 0314680 | 8/1990 | European Pat. Off. |
| 0 638 717 A2 | 2/1995 | European Pat. Off. |
| 3537996 | 5/1987 | Germany |
| 3641050 | 6/1987 | Germany |
| 8800287 | 1/1988 | WIPO |

OTHER PUBLICATIONS

Patent Abstracts of Japan JP 5180062 (Kojima) dated Jul. 20, 1993.

*Primary Examiner*—Andrew M. Dolinar
*Attorney, Agent, or Firm*—Herbert L. Lerner; Laurence A. Greenberg

[57] ABSTRACT

A fuel injection method for multicylinder internal combustion engines uses output signals of at least one camshaft sensor. A determination is made as a function of an engine or coolant temperature and an output signal of a camshaft sensor, in which cylinder of the internal combustion engine a fuel preinjection should take place prior to synchronization.

2 Claims, 1 Drawing Sheet

| | | camshaft sensor signal | | | | | | | |
|---|---|---|---|---|---|---|---|---|---|
| | | low | | | | high | | | |
| | | cylinder No. | | | | | | | |
| | | 1 | 2 | 3 | 4 | 1 | 2 | 3 | 4 |
| Ta < +40°C | Tm < -20°C | L | L | H | L | L | H | L | L |
| | -20°C ≤ Tm < 0°C | H | L | H | L | L | H | L | H |
| | 0°C ≤ Tm < +95°C | H | H | H | H | H | H | H | H |
| | +95°C ≤ Tm | H | L | H | L | L | H | L | L |
| Ta ≥ +40°C | Tm < -20°C | L | L | H | L | L | H | L | L |
| | -20°C ≤ Tm < 0°C | H | L | H | L | L | H | L | H |
| | 0°C ≤ Tm < +95°C | H | H | H | H | H | H | H | H |
| | +95°C ≤ Tm | L | L | L | L | L | L | L | L |

| | | camshaft sensor signal | | | | | | | |
|---|---|---|---|---|---|---|---|---|---|
| | | low | | | | high | | | |
| | | cylinder No. | | | | | | | |
| | | 1 | 2 | 3 | 4 | 1 | 2 | 3 | 4 |
| Ta < +40°C | Tm < -20°C | L | L | H | L | L | H | L | L |
| | -20°C ≤ Tm < 0°C | H | L | H | L | L | H | L | H |
| | 0°C ≤ Tm < +95°C | H | H | H | H | H | H | H | H |
| | +95°C ≤ Tm | H | L | H | L | L | H | L | L |
| Ta ≥ +40°C | Tm < -20°C | L | L | H | L | L | H | L | L |
| | -20°C ≤ Tm < 0°C | H | L | H | L | L | H | L | H |
| | 0°C ≤ Tm < +95°C | H | H | H | H | H | H | H | H |
| | +95°C ≤ Tm | L | L | L | L | L | L | L | L |

FUEL INJECTION METHOD FOR MULTICYLINDER INTERNAL COMBUSTION ENGINES

BACKGROUND OF THE INVENTION

FIELD OF THE INVENTION

The invention relates to a fuel injection method for multicylinder internal combustion engines, using output signals of at least one camshaft sensor.

In multicylinder engines with sequential fuel injection, from the time of engine starting until synchronization occurs, it is not known which cylinder is the one in which the next fuel injection should take place. The synchronization is typically accomplished through the use of a synchronizing mark on a transducer disk connected to the engine crankshaft and on a further transducer disk connected to the camshaft. In four-cylinder engines, as a rule it is constructed as a segmented disk with one segment 180° wide (high) and a gap of equal width (low). The two transducer disks are scanned in contactless fashion by sensors. It is suitable to adjust the transducer disks in such a way that during engine operation, the edge signals (the transition from low to high, or vice versa) of the camshaft sensor appear shortly after the synchronizing mark signals of the crankshaft sensor. Systems with only one sensor are also known.

By evaluating the sensor signals, after synchronization (the movement of a synchronizing mark or segmented edge past the associated sensor), it is possible to ascertain unequivocally which cylinder is the one where the next fuel injection or ignition should occur. Through the use of further incremental marks on the crankshaft transducer disk, it is possible to ascertain the current angular position of the crankshaft.

In the nonsynchronous phase at the onset of starting, sequential fuel injection in the fixed ignition order, which is typically 1-3-4-2, cannot yet take place. That phase lasts until the appearance of the first synchronizing mark or segmented edge, and in the least favorable case lasts one entire crankshaft revolution. In order to keep the engine starting time as short as possible, a fuel injection is effected beforehand in that nonsynchronous phase, so that the first ignition spark appearing after synchronization will already find an ignitable mixture ready for it.

For instance, it is known from European Patent 0 314 680 B1, corresponding to Published International Patent Application WO 88/00287, that such fuel injection prior to the synchronization takes place in the form of so-called "bank injection" (simultaneously for all of the cylinders) at the onset of crankshaft revolution, regardless of the position of the camshaft or of other parameters. That greatly speeds up starting performance.

A disadvantage of such bank injection carried out beforehand is that some cylinders, after synchronization occurs, receive the quantity of fuel from the preinjection and additionally receive a quantity of fuel from the first sequential injection after synchronization, while the remaining cylinders receive only the quantity of fuel from the preinjection. The consequence is a variously distributed fuel-air mixture over the various cylinders, which particularly at low engine temperatures can cause "overenrichment" of the cylinders that receive double doses of fuel.

At operating temperatures up to about 95° C., bank preinjection offers certain advantages in terms of faster starting times, and at temperatures between about 0° C. and +75° C. it has hardly any disadvantages. However, at very high engine temperatures of >95° C. bank preinjection is disadvantageous, because the double dosing of two cylinders (in a four-cylinder engine) allows so-called "starting knocking" to occur. However, starting knocking can also occur at high aspirated air temperatures.

SUMMARY OF THE INVENTION

It is accordingly an object of the invention to provide a fuel injection method for multicylinder internal combustion engines, which overcomes the hereinafore-mentioned disadvantages of the heretofore-known methods of this general type and which is capable of avoiding multiple injection quantities in critical regions prior to synchronization and thus of avoiding overenrichment of a fuel-air mixture and starting knocking.

With the foregoing and other objects in view there is provided, in accordance with the invention, a fuel injection method for multicylinder internal combustion engines, which comprises determining as a function of an engine or coolant temperature and output signals of at least one camshaft sensor, in which cylinder of the internal combustion engine a fuel preinjection should take place prior to synchronization.

In accordance with a concomitant mode of the invention, there is provided a fuel injection method which comprises additionally determining the cylinders into which the fuel preinjection should take place as a function of an aspirated air temperature of the internal combustion engine.

Other features which are considered as characteristic for the invention are set forth in the appended claims.

Although the invention is illustrated and described herein as embodied in a fuel injection method for multicylinder internal combustion engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figures 1, 2:
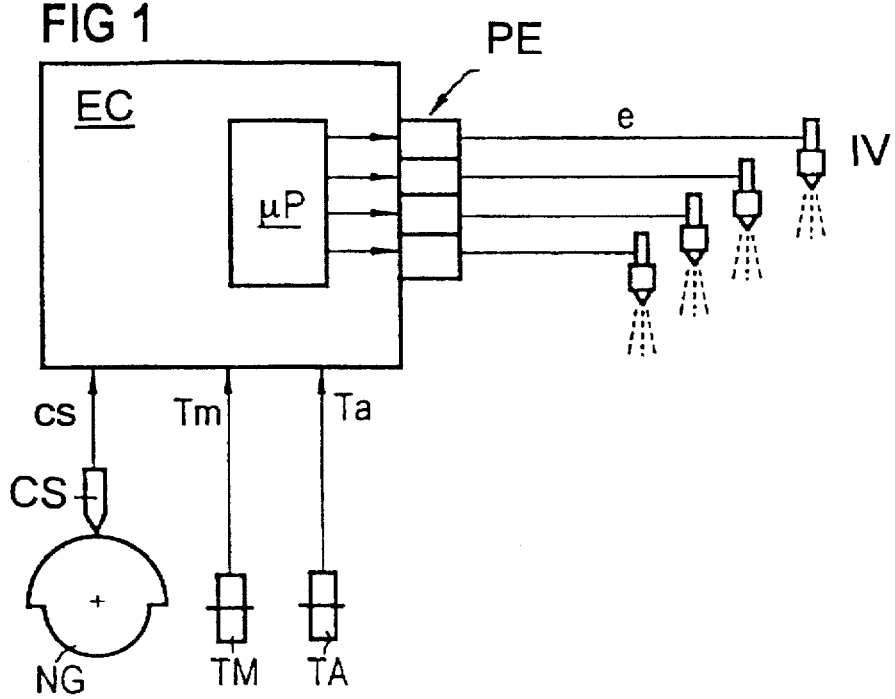
FIG. 1 is a schematic and diagrammatic illustration of a fuel injection system for an internal combustion engine.
FIG. 2 is a table of cylinders in which fuel preinjection takes place.

Referring now to the figures of the drawings in detail and first, particularly, to FIG. 1 thereof, there is seen a diagrammatic and schematically illustration of a sequential fuel injection system of a four-cylinder engine. Trigger signals e for four injection valves IV are generated from sensor signals in a microprocessor µP of an engine control unit EC in the usual way. The sensors are not shown, except for a camshaft sensor CS at a camshaft NG, a coolant temperature sensor TM, and optionally an aspirated air temperature sensor TA, which are required for performing the method according to the invention in the exemplary embodiment. These trigger signals e, which are reinforced by power end stages PE, are sent to the injection valves IV.

In this exemplary embodiment, the trigger signals e for the four injection valves IV are stored in a memory region of the microprocessor μP. In engines with up to four cylinders, the memory region which is not shown in FIG. 1 is a memory region including eight bytes as a function of the following parameters:

output signal cs of the camshaft sensor CS, coolant water temperature Tm (four ranges), and aspirated air temperature Ta (two ranges), as shown in the table in FIG. 2. In the case of engines with up to eight cylinders, 16 bytes of memory would be needed for this purpose. In a simplified version not taking into account the aspirated air temperature, four bytes would suffice (or eight bytes for an engine with a maximum of eight cylinders).

Each byte includes eight bits, and of each byte, four bits are assigned to the four cylinders of the engine for a camshaft signal cs=high, while the other four bits are associated with the camshaft sensor signal cs=low.

When the engine is started, the byte assigned to the instantaneously valid parameters cs, Tm and Ta is selected, and a certain quantity of fuel is preinjected into the cylinders indicated by that byte. For instance, where Ta=+20° C., Tm=−5° C. and cs=low, preinjection takes place into cylinders numbers 1 and 3 (conversely if cs=high, preinjection is carried out into cylinders 2+4).

In this exemplary embodiment, it is contemplated that at temperatures Tm<−20° C., a preinjection is carried out into only one cylinder; at −20° C.≦Tm<0° C., it is carried out into two cylinders; at 0° C.≦Tm<+95° C., it is carried out into all cylinders (the known bank injection method); and at Tm≧+95° C., depending on the aspirated air temperature, it is carried out into two cylinders (if Ta<+40° C.) or in none of the cylinders (if Ta≧+40° C.). In the case of other engines, a different choice of cylinders and more temperature ranges or fewer may be provided in order to attain the stated object.

Although preinjection into two cylinders is carried out, that is in terms of FIG. 2 either into cylinders 1+3 or cylinders 2+4, this must not be mistaken for the known method of group injection, which in the four-cylinder engine for the ignition order given above includes the cylinders having the same direction of motion, in other words either the cylinders 1+4 or the cylinders 2+3.

Through the use of the method described above, both overenrichment of the mixture at low engine temperatures and starting knocking at high aspirated air temperatures are avoided, without having to lose the advantages of an accelerated start achieved through the known method of bank injection at engine operating temperature.

I claim:

1. A fuel injection method for multicylinder internal combustion engines, which comprises:

determining, prior to an injection synchronization of a multicylinder internal combustion engine, as a function of an engine or coolant temperature and output signals of at least one camshaft sensor, in which of the cylinders of the internal combustion engine a fuel preinjection should take place prior to synchronization, and pre-injecting fuel into one or more cylinders according to a result obtained in the determining step.

2. The fuel injection method according to claim 1, which comprises additionally determining the cylinders into which the fuel preinjection should take place as a function of an aspirated air temperature of the internal combustion engine.

* * * * *